Sept. 1, 1953     J. KOOME ET AL     2,650,941
CONVERSION OF CARBOHYDRATES TO POLYHYDRIC ALCOHOLS
Filed March 20, 1951
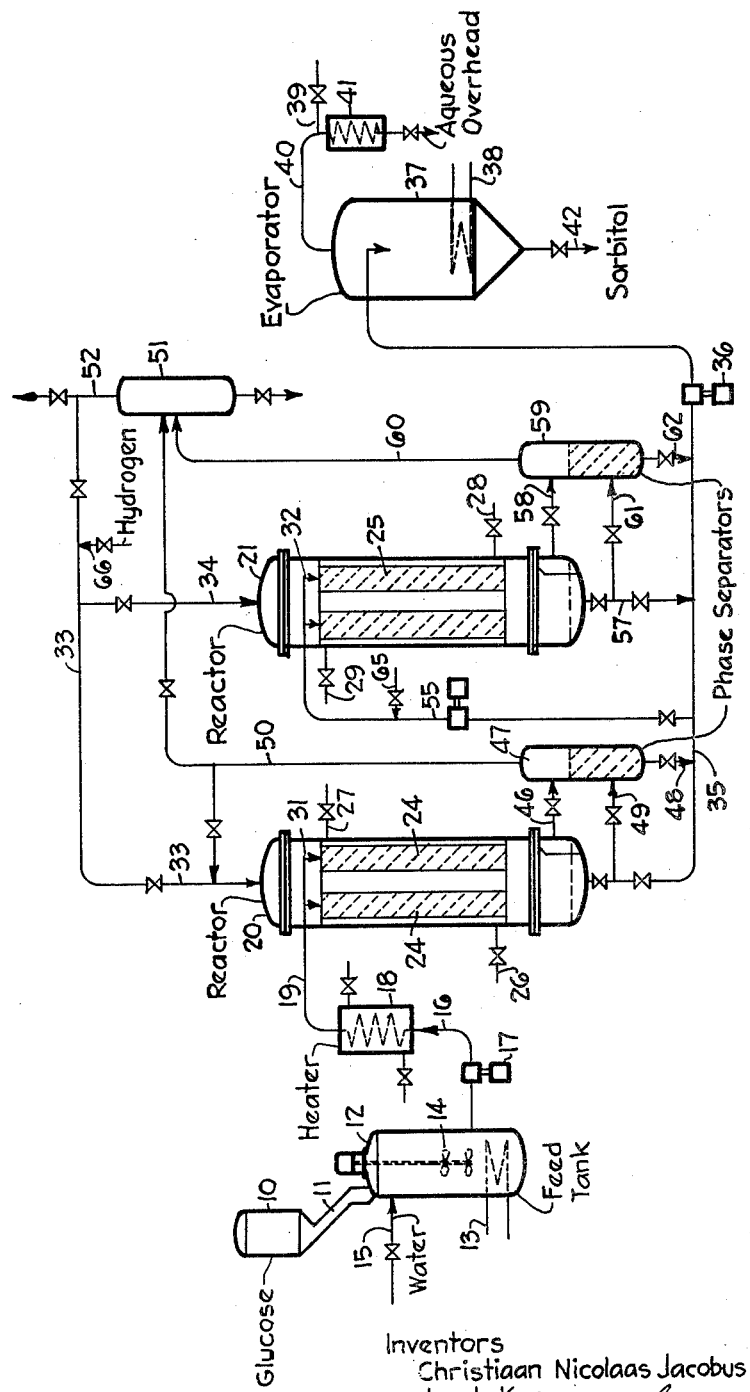
Inventors
Christiaan Nicolaas Jacobus de Nooijer
Jacob Koome
By E. Walter Mayk
their Agent Patented Sept. 1, 1953

2,650,941

UNITED STATES PATENT OFFICE 2,650,941

CONVERSION OF CARBOHYDRATES TO POLYHYDRIC ALCOHOLS

Jacob Koome and Christiaan Nicolaas Jacobus de Nooijer, Amsterdam, Netherlands, assignors to Shell Development Company, Emeryville, Calif., a corporation of Delaware Application March 20, 1951, Serial No. 216,506
In the Netherlands April 6, 1950

15 Claims. (Cl. 260—635)

This invention relates to the production of polyhydroxy compounds from carbohydrates. The invention relates more particularly to the production of polyhydroxy alcohols having six carbon atoms to the molecule from carbohydrates with the aid of fixed beds of granular catalysts. A particular aspect of the invention relates to the continuous conversion of readily available impure monosaccharides to high purity hexitols with the aid of fixed beds of granular catalysts.

Polyvalent alcohols having at least six carbon atoms to the molecule have become of major importance, not only because of increased utilization as such in many fields of application, but because of their value as starting and intermediate materials in the production of highly valuable chemical derivatives. Suitability of the polyhydroxy alcohols for use in many fields of application, for example, suitability of sorbitol for vitamin C production is, however, dependent upon the absence therein of any substantial amounts of impurities.

A large and readily available potential source of highly desirable polyhydroxy compounds comprising hexitols are carbohydrates, such as, for example, starch and the various starch derivative mixtures such as starches hydrolyzed to various stages of completion, including such materials as commercial glucose. The production of polyhydric alcohols in a relatively high state of purity from readily available carbohydrates such as starch or partially hydrolyzed starch, in processes generally employed heretofore, if at all possible is generally beset with difficulties militating against practical operation. Methods have been disclosed, heretofore, wherein polysaccharides are converted to polyhydric alcohol-containing materials in two successive stages. In the first stage polysaccharides are hydrolyzed to monosaccharide-containing mixtures which are then reduced to polyhydric alcohol-containing mixtures in a distinct and separate operation. Conditions prevailing in the second stage of such two-stage processes generally enable the reduction of only monosaccharides and, therefore, only pure monosaccharides must be charged to the second stage if the production of a polyhydric alcohol of high purity is to be obtained. Hydrolysis of carbohydrates in the first stage of the process, however, never proceeds to completion. Thus, the hydrolysis of starch to glucose generally results in a glucose containing substantial amounts of polysaccharides comprising dextrins. Since such dextrins are not reduced in the second stage of these processes a polyhydric alcohol, such as a sorbitol, of high purity is usually not obtained by such methods without first separating glucose in a high state of purity from the hydrolysis products emanating from the first stage of the process. Such separation, however, is of such complexity and generally so costly that its incorporation in the two-stage process renders its use highly impractical.

Methods disclosed heretofore directed to a direct conversion of polysaccharides to polyhydric alcohols are generally found to be unsatisfactory. Throughput rates and yields are often exceedingly low, and the production of a specific alcohol in a high state of purity is often difficult if not impossible. It has been disclosed, heretofore, to effect the direct conversion in the presence of acid-promoted catalysts. The presence of acidic agents, though sometimes speeding up the rate of hydrolysis of the polysaccharides are often found to have a decidedly detrimental effect upon the ability of the catalysts to catalyze the reduction of monosaccharides to the desired alcohol thereby detracting materially from any advantage which might reside in resorting to this type of operation. A further disadvantage often encountered in many of such single-stage methods disclosed heretofore is the unavoidable production of undesired by-products thereby increasing difficulties inherent in the recovery of a pure product from the reaction mixture.

A method enabling the direct conversion of polysaccharides to polyhydric alcohols of a high degree of purity is described and claimed in U. S. Patent 2,518,235. Such a process, however, is generally dependent upon the use of the catalyst in a finely divided state suspended in the reaction mixture. The need to rely upon a finely divided catalyst suspended in the liquid reaction mixture often presents difficulties detracting materially from efficient utilization of the process. Continuous operation is thereby rendered difficult because often catalysts and reactants are withdrawn simultaneously from the reaction zone and a relatively long contact time is required. Efficient operation of such processes is generally dependent upon the use of large amounts of hydrogen which must be passed through the reaction zone at relatively high velocity to maintain the finely divided catalyst properly dispersed. A further serious disadvantage inherent in such methods resides in difficulty encountered in effecting substantially complete removal of the finely divided catalyst from reactor effluent. Catalyst thus recovered, generally by a multiplicity of steps, is often unsuited for further use without treatment directed to its reactivation. The use of finely divided catalysts was necessitated heretofore, however, because of the inability to effect the efficient conversion of carbohydrates to polyhydric alcohols of high purity with the aid of fixed beds of solid catalysts in the processes disclosed heretofore.

It is an object of the present invention to provide an improved process enabling the more efficient catalytic conversion of carbohydrates to polyhydric compounds in continuous operation wherein the catalysts are employed in the form of a fixed bed.

Another object of the invention is the provision of an improved process enabling the more efficient catalytic conversion of carbohydrates to polyhydric alcohols of high purity in a continuous operation wherein the catalysts are used in the form of fixed beds.

Still another object of the invention is the provision of an improved process enabling the more efficient catalytic conversion of carbohydrates to polyhydric alcohols having six carbon atoms to the molecule in a continuous operation wherein the catalyst is employed in the form of a fixed bed.

A further object of the invention is the provision of an improved process enabling the more efficient catalytic conversion of admixtures of monosaccharides and polysaccharides to polyhydric alcohols having six carbon atoms to the molecule of high purity in a continuous operation wherein catalysts are employed in the form of a fixed bed.

A more particular object of the invention is the provision of an improved process enabling the more efficient catalytic conversion of impure glucose comprising glucose in admixture with dextrins to sorbitol of high purity in a continuous operation wherein the catalyst is employed in the form of a fixed bed.

A still more particular object of the invention is the provision of an improved process enabling the more efficient catalytic conversion of the products resulting from the incomplete hydrolysis of starch to hexitol of high purity with the aid of a catalyst in the form of solid granular catalyst beds. Other objects and advantages of the invention will become apparent from the following detailed description thereof.

It has now been found that carbohydrates are converted efficiently in continuous operation to polyhydric alcohols of high purity by passing an aqueous solution of the carbohydrates and hydrogen downwardly through a bed of granular nickel-containing catalyst having a high nickel content and wherein the nickel is promoted by the presence of nickel silicate at a temperature above about 100° C. and a pressure in excess of about 25 atmospheres. In accordance with the invention mixtures of mono- and polysaccharides such as, for example, partially hydrolyzed starch containing glucose in admixture with dextrins are converted to sorbitol of high purity by passing an aqueous solution of the mixture downwardly through a bed of granular nickel-containing catalyst having a nickel content above about 20% and wherein the nickel is promoted by the presence of nickel silicate at a temperature above about 100° C. and a pressure in excess of about 25 atmospheres while maintaining the catalyst in a hydrogen atmosphere.

Organic materials converted to polyhydric alcohols in accordance with the invention comprise the carbohydrates. The term "carbohydrates" as used throughout this specification and appended claims includes the monosaccharides, the di-, tri- and tetra-saccharides called the "oligosaccharides," and the saccharides having more than four basic monosaccharide groups which are termed the "polysaccharides."

The ability to employ the catalysts in the form of beds of granular catalysts in the process of the invention is attributable directly to the nature of the catalysts used. The incorporation into the nickel catalyst of nickel in the form of nickel silicate results in a catalyst which not only is particularly effective in the direct conversion of carbohydrates to polyhydric alcohols but which, though of high nickel content, nevertheless has an exceedingly high mechanical strength thereby enabling its efficient use in the form of stationary beds.

A further advantage of the process of the invention resides in its ability to utilize as support for the nickel and the nickel compounds constituting the active components of the catalysts any of the many readily available carrier materials in combination with large amounts of nickel without sacrificing either strength or effectiveness of the catalysts. Examples of carrier materials which are used as solid support components of the catalysts are the various aluminous and silicious materials of natural or synthetic origin such as bauxite, aluminum oxide, activated alumina, sintered kieselguhr, magnesium oxide, magnesium silicate, magnesium carbonate, barium sulphate, pumice, kaolin, porous plate, activated carbon, clays, including the various types of non-acid treated and acid treated clays, Carborundum, Alundum, majolica, and the like. Of the above class of support materials, those possessing adsorptive properties are preferred such as, for example, adsorptive alumina, bauxite, kieselguhr, and the like. A particularly preferred type of support material comprises the white bauxite produced in Surinam.

In order to attain the objects of the invention, it is essential that nickel be present in the catalyst in high concentration. The catalysts employed in the process of the invention have a nickel content above about 25% by weight. Those wherein the total nickel content is above about 35% are particularly preferred. The total nickel content of the catalysts may range as high as 90% without encountering any substantial physical disintegration during use. As indicated above, an essential feature of the invention is the presence in the catalysts of nickel in the form of the nickel silicate in addition to reduced nickel. The amount of nickel present in the form of the silicate should be equal to at least 20% of the total nickel content of the catalyst and should not exceed about 60% of the total nickel content of the catalyst.

The catalysts employed in the process of the invention containing a total nickel content, and a nickel silicate content, within the above prescribed limitations may be prepared by the method of catalyst preparation disclosed and claimed in co-pending application Serial No. 2,133, filed January 13, 1948, now Patent No. 2,548,159. The catalyst may be prepared, for example, by preparing an aqueous solution of a soluble nickel salt, such as, for example, nickel nitrate, and adding the solid support material such as, for example, alumina to this solution and slurrying it therein. A suitable amount of soluble silicate such as, for example, sodium or potassium silicate, is added to an alkaline solution to be used as precipitating agent such as, for example, commercial soda containing sodium hydroxide and sodium carbonate in approximately equal amounts, and this mixture of solutions is then added to the slurry of nickel nitrate and support material, to cause the precipitation of the mixed silicate, hydroxide and bicarbonate of nickel. The carbonate, bicarbonates, hydroxides and silicates of sodium and potassium are generally used although the corresponding compounds of the other alkali metals can be used in the catalyst preparation. In making up the alkali solution, the total amount of alkali required to precipitate all the nickel is first calculated and then the desired portion of the total alkali, e. g., 20 to 60%, is substituted by the alkali silicate solution taking into consideration the ratio of alkali to silica in the alkali silicate used. It is convenient to first adjust the alkali in the silicate solution to give the meta-silicate. When a sodium or potassium carbonate solution is used it is desirable to add the silicate solution thereto just prior to the precipitation in order to avoid flocculation of the silica. The alkali may be added to the slurry or the slurry may be added to the alkali solution, or the two liquids may be simultaneously introduced into a mixing and precipitating zone. While the carrier material is preferably slurried with the nickel salt solution, it may, if desired, be slurried with the alkali solution. The solid support material may also, if desired, be added after the precipitation is partially or wholly completed by mixing it with the wet precipitate or by combining it with the precipitate after washing and drying.

In an alternative method the solutions of the nickel salt and the alkali are combined, either in the presence or absence of the carrier material, the proportion of alkali being insufficient to precipitate all of the nickel, and then a dilute solution of alkali silicate is added to complete the precipitation.

In another alternative, the carrier is slurried with a solution of the alkali silicate. The solution of the nickel salt is then added causing precipitation of the nickel silicate. Finally the remaining portion of the nickel salt is precipitated by the alkali, e. g., potassium or sodium carbonate.

In still another method, the nickel salt is precipitated with alkali in the usual manner in the presence or absence of the carrier material. The nickel silicate is separately precipitated by any known method, e. g., by mixing solutions of an acid salt of the nickel and alkali silicate. The precipitated silicate, after washing and if desired also drying, is then mixed with the wet or dry main catalyst mass to produce the desired mixture. In these various alternatives, the precipitation may also be carried out either hot or cold and either slowly or quickly.

The mixture comprising the precipitated nickel in the form of nickel silicate and decomposable nickel compounds and carrier material is subjected to a shaping operation such as pelleting, tableting, or the like converting it to suitable particle size. The particle size employed may vary widely within the scope of the invention. The presence of any substantial amount of particles sufficiently small to impede film-flow through a bed of the catalyst, is however, avoided. Suitable catalyst particle size comprises that passing through a No. 3 screen and retained by a No. 20 screen. A particle size passing a No. 3 screen and retained by No. 10 screen is preferred. Particles larger than those passing through a No. 3 screen may, however, be employed. Identifying screen numbers employed are those of the U. S. Sieve Series. Before or after shaping, but preferably after, the shaped mixture is subjected to conditions capable of reducing the reducible nickel compound. Reduction of the reducible nickel compound is accomplished by subjecting the shaped catalyst mixture to elevated temperature, optionally in the presence of steam, or added gases, thereby effecting the decomposition of the decomposable nickel compounds to the oxide and thereafter reducing the nickel oxide by the passage of a reducing gas, such as hydrogen, therethrough. The nickel silicate is difficultly reducible and remains in the form of the nickel silicate during the reduction of the reducible nickel compounds. Consequently the finished catalyst contains part of the nickel as finely reduced nickel in intimate admixture with non-reduced nickel silicate, which latter material confers desirable characteristics to the finished catalyst such as a promotional effect, and an enhancement of mechanical structure. It is to be stressed that the invention is in no wise limited by the method of production of the catalyst containing the nickel and nickel silicate in intimate admixture with the carrier in the proportions above prescribed.

The preparation of a high nickel content catalyst particularly suitable for use in the process of the invention is illustrated by the following example:

EXAMPLE I 0.5 liter of sodium meta-silicate solution containing 56 grams of $SiO_2$ was added to 4.5 liters of a boiling sodium carbonate solution containing 420 grams $Na_2CO_3$. After stirring for a few seconds, 5 liters of a boiling solution of nickel nitrate containing 200 grams nickel was added in the space of one minute. After stirring for another 2 minutes the precipitate was filtered and washed out with 24 liters of water at 45° C. After seven hours' drying at a temperature of 110° C., the mass was pulverized and passed through a sieve having 16 holes per linear centimeter and again dried at 110° C. The mass contained 43.5% nickel. 421 grams of this powder was mixed with 231 grams of activated Surinam bauxite in powder form which had been heated at 500° C. for a period of two hours, and 6.5 grams of powdered graphite. The mixture was compressed into lumps 5 x 3 mm. in size, which could bear a pressure of 18 kg. and had a bulk density of 1450 grams per liter. The catalyst was reduced by treatment with 200 liters of hydrogen per hour throughout a period of 24 hours at atmospheric pressure at a temperature of 275–300° C.

The catalyst thus prepared consisted essentially of 100 parts by weight of nickel, 28 parts by weight of $SiO_2$ and 122 parts by weight of alumina.

The carbohydrates to be converted to polyhydric alcohols in accordance with the invention are dissolved in a suitable solvent prior to contact with the high nickel content catalysts. A satisfactory solvent comprises water. Any solvent which is relatively inert under the conditions of execution of the reaction and which is separable from the reaction mixture may, however, be employed. The concentration of the carbohydrate in the solvent charged to the system may vary within the scope of the invention. In general, it is preferred to employ relatively dilute aqueous solutions since highly concentrated solutions tend to result in a more rapid deterioration of catalyst activity. Concentrations in the range of from about 20% to about 70% have been found satisfactory. Concentrations in the lower part of the prescribed range, for example, from about 20% to about 50% are particularly preferred.

The aqueous solutions of the carbohydrates are contacted with the catalyst at a temperature in the range of, for example, from about 100° C. to about 220° C. The particular temperatures employed within the prescribed permissible temperature range will vary in accordance with the specific carbohydrate material charged and operating conditions employed. When employing as the carbohydrate charge one consisting essentially, or predominantly of, monosaccharides, the oligosaccharides or mixtures thereof, the use of the lower temperatures within the above prescribed broad range is preferred, for example, about 100° C. to about 165° C. and still more preferred from about 120° C. to about 150° C. When charging materials consisting essentially of higher carbohydrates, for example polysaccharides such as dextrins, starch, etc., or materials comprising a lower saccharide in admixture with higher saccharides such as incompletely hydrolyzed starch, commercial grade glucose containing dextrins and some unconverted starch in addition to glucose, the use in at least a portion of the reaction zone of the higher temperatures within the prescribed permissible broad temperature range, for example, from about 150° C. to about 250° C., is preferred, and still more preferred from about 180° C. to about 220° C.

In a preferred method of executing the process of the invention, a temperature gradient increasing in the direction of flow of the reactants is maintained through the reaction zone. Maintenance of the desired temperature conditions within the reaction zone is obtained by preheating materials charged to the reaction zone and/or by additional heating means positioned in or about the reaction zone. Although pressure as low as 25 atmospheres may be employed during execution of the conversion in accordance with the invention, it is preferred to use a higher pressure, for example, above about 45 atmospheres. A pressure in the range of, for example, from about 50 to about 200 atmospheres is particularly preferred. Higher pressures may, however, be employed within the scope of the invention.

Hydrogen, or a gas providing hydrogen under the reaction conditions employed, is introduced into the reaction zone. Rate of hydrogen introduction into the reaction zone is controlled to maintain a hydrogen atmosphere in the reaction zone and within the catalyst bed during the execution of the process. An advantageous feature of the invention resides in the ability to obtain the desired efficient conversion with the utilization of substantially smaller amounts of hydrogen than generally required in processes disclosed heretofore. Thus, introduction of hydrogen in the reaction zone may be limited to substantially no more than that required to replace hydrogen consumed and that dissolved in reactor effluent. Good results have been obtained in the conversion of carbohydrates comprising glucose to sorbitol with the use of an amount of hydrogen-containing gas ranging from 50 to 1000 liters per kilogram of aqueous carbohydrate solution charged to the reaction zone. Continuous processes used heretofore, employing finely divided suspended nickel catalysts, necessitate the use of substantially greater amounts of hydrogen containing gas in order to avoid settling of catalyst in the reaction zone and to assure proper stirring of the reaction mixture. Generally, it is found necessary in such processes used heretofore to employ about 2500 to about 3000 liters of hydrogen gas per kilogram of sugar solution charged. Because of the relatively small amount of hydrogen that need be employed in the process of the invention, the recycling of gas may well be dispensed with without detracting materially from the advantageous economy of the process.

Throughput rates will vary to some extent in accordance with the specific materials charged, operating conditions employed, and the like. Throughput rates of from about 0.1 to about 15 kilograms, and preferably from about 0.5 to about 5 kilograms, of carbohydrate solution per liter of catalyst per hour may be employed. Higher and lower throughput rates may be employed, however, in accordance with the invention.

An essential feature, necessary to the attainment of the objects of the invention, comprises the downward flow through the catalyst bed of not only the solution of carbohydrate charge, but also of the hydrogen introduced into the reaction zone. Introduction of the liquid charge into the reaction zone is controlled to obtain the passage of at least a substantial part thereof through the catalyst bed in the form of a liquid film flowing over the catalyst particles in the absence of any substantial flooding of the catalyst bed. In this wise not only does the reaction proceed efficiently with conversion of carbohydrates to polyhydric alcohols, but the physical structure of the catalyst is maintained intact over prolonged periods of operation without contamination of the catalyst surface by the formation thereon of substantial amounts of undesirable deposits contributing to deterioration of activity.

Any suitable means may be employed to obtain distribution of the liquid charge into the catalyst bed. Such means may comprise, for example, perforated plates, spray nozzles, spray rings, bubble decks, and other types of conventional liquid distributing means enabling the dripping, trickling or spraying of the charge into the catalyst bed in a manner avoiding a flooding of the catalyst bed.

Under the above-defined conditions, carbohydrates are converted to polyhydric alcohols corresponding to the basic structural grouping of the monosaccharides. The monosaccharides containing the aldehyde group are hydrogenated in the process of the invention to a product consisting essentially of a polyhydric alcohol having the same number of carbon atoms and the same space configuration of units attached to carbon atoms as the monosaccharide from which it is derived but with a hydroxyl group attached to the aldehyde carbon atom in place of the aldehyde oxygen atom. Glucose, for example, is converted to a product consisting essentially of sorbitol. Monosaccharides containing a keto group in the molecule, because of the asymmetric nature of the keto carbon atom, are hydrogenated to a product containing two distinct isomeric polyhydric alcohols each of which has the same number of carbon atoms and space configuration of units attached to the carbon atoms as the parent monosaccharide. Fructose, for example, is hydrogenated to a product comprising both sorbitol and mannitol. Examples of monosaccharides converted in accordance with the invention are d-arabinose, l-arabinose, l-ribose, d-xylose, l-glucose, d-glucose, d-fructose, l-fructose, d-galactose, d-mannose, l-mannose, l-galactose, l-altrose, d-allose, l-gulose, d-idose, d-talose, etc.

A particularly valuable feature of the invention resides in its ability to enable the direct conversion, under the above-defined conditions, of the di-, tri-, tetra-, and polysaccharides to the polyhydric alcohols which correspond to the structural monosaccharide groups. Without intent to limit in any way the scope of the invention by any theory advanced herein to set forth more fully the nature of the invention, it is believed that di-, tri-, tetra-, and polysaccharides are hydrolyzed to intermediate monosaccharides, and that such hydrolysis of di-, tri-, tetra-, and polysaccharides takes place simultaneously with reduction of monosaccharides to polyhydric alcohols corresponding to the monosaccharides under the above-defined conditions of execution of the process of the invention. Examples of the disaccharides which are converted to polyhydric alcohols corresponding to monosaccharides in the process of the invention are: sucrose, maltose, lactose, cellobiose, melibiose, etc. Trisaccharides are illustrated by raffinose. The polysaccharides which are composed of a great many of the same or different basic monosaccharide groups and which are converted, under the above-defined conditions of the process of the invention, to polyhydric alcohols consisting essentially of polyhydric alcohols corresponding to the structural monosaccharide groups are exemplified by the dextrins, starches, inulins, glycogens, celluloses, hemi-celluloses, etc.

The carbohydrate charge to the process of the inventon may comprise a single carbohydrate or a mixture of two or more different carbohydrates. Examples of additional carbohydrate materials which are converted to polyhydric alcohols in accordance with the process of the invention comprise sucrose, dextrose, mixtures of glucose and dextrins, black strap molasses, partially or incompletely hydrolyzed starch, etc.

In order to set forth more fully the nature of the invention it will be described in its application to the production of sorbitol of high purity from a mixture comprising a monosaccharide and a polysaccharide with reference to the attached drawing forming a part of the present specification and wherein the single figure represents one form of apparatus suitable for carrying out the process of the invention.

In accordance with the invention, a carbohydrate material, for example, incompletely hydrolyzed starch, comprising glucose in admixture with dextrins, is taken from a suitable source of supply such as a tank 10, and passed through conduit 11 into a mixing tank 12 provided with suitable heating means such as a closed heating coil 13, and agitating means such as a stirrer 14. Water is introduced into tank 12 from an outside source by means of valved line 15. Within tank 12 the impure glucose is dissolved in added water forming an aqueous solution containing from about 20% to about 50% of the glucose-containing carbohydrate mixture. From mixing tank 12 the aqueous carbohydrate solution is forced through line 16 by means of pump 17 into a suitable heating means such as, for example, indirect heat exchanger 18. From heat exchanger 18 the heated aqueous carbohydrate solution is passed through line 19 into a reaction zone.

The reaction zone may comprise one or more reactors such as, for example, chambers 20 and 21, containing reactor tubes 24 and 25 filled with particles of high nickel content catalyst of the type defined above promoted by the presence therein of nickel in the form of nickel silicate. The aqueous carbohydrate stream is passed from line 19 through suitable distributing means such as, for example, distributor nozzles 31, over the catalyst bed in tubes 24. The rate of introduction of the aqueous carbohydrate stream is controlled to result in a trickling of the solution downwardly through the catalyst bed, thereby effecting the passage of at least a substantial amount of the aqueous carbohydrate stream through the catalyst bed in the form of a liquid film flowing over the surface of the catalyst particles in the absence of any substantial flooding of the catalyst bed.

A hydrogen atmosphere is maintained in reactor 20 and in the catalyst beds therein by the introduction of hydrogen, or a hydrogen-containing gas into the upper part of reactor 20 by means of valved line 33.

The temperature within reactor 20 is maintained in the range of from about 100° C. to about 250° C. and preferably from about 120° C. to about 150° C. Pressures within the reactor are maintained above about 30 atmospheres, for example, in the range of from about 50 to about 200 atmospheres.

Temperature conditions are maintained within reactor 20 by means of indirect heat exchanger 18 and by the passage of a heat controlling fluid, such as oil, steam, or the like through chamber 20 in direct contact with the outside wall surface of catalyst tubes 24. Valved lines 26, 27, 28 and 29 are provided for such circulation of heat controlling fluid around catalyst tubes 24 and 25.

Under the above-defined conditions carbohydrates comprising glucose and dextrins are converted in catalyst tubes 24 to polyhydric alcohols consisting essentially of sorbitol in the absence of any substantial undesirable side reactions.

Liquid comprising sorbitol in aqueous solution passes from tubes 24 to the lower part of reactor 20 and is taken therefrom through valved line 35 and forced, by means of pump 36, into suitable evaporating means such as, for example, evaporator 37 provided with suitable heating means such as a closed heating coil 38. Suitable exhausting means, not shown in the drawing, enabling the maintenance of reduced pressures within evaporator 37 by means of valved line 39 may be provided. Within evaporator 37 materials lower boiling than sorbitol, comprising water, are vaporized and removed by means of valved line 40 provided with cooler 41. Liquid comprising polyhydric alcohol consisting essentially of sorbitol is withdrawn from evaporator 37 through valved line 42.

To aid in assuring the avoidance of any flooding of the catalyst beds, no substantial amount of liquid is generally permitted to accumulate in the lower part of reactor 20. Liquid is preferably withdrawn from reactor 20 through line 35 at a rate avoiding any substantial accumulation of liquid therein.

Gaseous materials, consisting essentially of hydrogen are taken from reactor 20 at a point below the catalyst beds by means of valved line 46 and introduced into drum 47. Entrained liquid collecting in drum 47 is passed therefrom through valved line 48 into line 35. If desired, all or a part of the liquid effluent from reactor tubes 24 may be taken from reactor 20 by means of line 49 discharging into drum 47. Liquids thus passed into drum 47 are therein freed of at least a substantial part of any gaseous materials they may comprise before passing through valved line 48 into line 35 leading to evaporator 37.

From drum 47 gases comprising hydrogen are passed through valved line 50 into a suitable hydrogen accumulator illustrated in the drawing by drum 51. Hydrogen may be recycled from drum 51 by means of valved lines 52 and 33 to reaction chamber 20. In the process of the invention, only sufficient hydrogen need be introduced into the reactors to assure maintenance of a hydrogen atmosphere within reactor 20 and in the catalyst bed of tubes 24. Hydrogen introduction through valved line 33 into chamber 20 may, therefore, be limited to an amount not substantially exceeding that necessary to replace hydrogen consumed in the reaction and that escaping from reactor 20 through lines 35 and 46. Higher amounts of hydrogen may, however, be passed downwardly through the reactor bed within the scope of the invention.

As pointed out above, it is at times preferred to maintain a progressively increasing temperature gradient downwardly through the catalyst bed. By control of heat input into heat exchanger 18 and the rate of circulation of heating fluid around reactor tubes 24, and optionally by other means not shown in the drawing, such increasing temperature gradient is readily maintained downwardly through the bed of catalyst in tubes 24. The increasing temperature gradient in the direction of flow may, however, also be maintained by the use of a plurality of reactors connected in series wherein each successive reactor is maintained at a higher temperature. The use of the increasing temperature gradient is particularly advantageous when the carbohydrate charge to the system comprises substantial amounts of polysaccharides in addition to monosaccharides and/or oligosaccharides. When using a plurality of reactors, for example, reactors 20 and 21, in series, the temperature in the first reactor is preferably maintained in a relatively low range still suitable to the conversion of monosaccharides to polyhydric alcohols, for example, in the range of from about 100° to about 180° C., and the catalyst in the second reactor is preferably maintained at a temperature conducive to a more rapid conversion of polysaccharides to polyhydric alcohols, for example, from about 150° C. to about 250° C. When employing a plurality of reactors the pressures employed in the individual reactors may vary from one another. Substantially identical types of catalysts are, however, employed in all of the reactors. Hydrogen is admitted into the upper part of reactor 21 by means of valved line 34, the hydrogen passing downwardly through the catalyst bed currently with the liquid stream emanating from reactor 20 comprising carbohydrates, sorbitol and water.

In thus converting carbohydrates consisting essentially of glucose in admixture with a substantial amount of dextrins in a reaction zone comprising reactors 20 and 21 arranged in series flow, temperatures in reactor 20 are maintained in the range of, for example, from about 100° C. to about 180° C., and preferably from about 100° C. to about 130° C., thereby effecting primarily a conversion of glucose to sorbitol. Liquid effluence from catalyst tubes 24, now containing a higher ratio of dextrins to glucose than the initial charge, and comprising sorbitol, is forced from reactor 20 through lines 35 and 55 into the upper part of reactor 21. Within reactor 21 the stream discharging from line 55 through distributor nozzles 32 is trickled over the catalyst in tubes 25 to descend downwardly therethrough at temperatures conducive to the more rapid conversion of dextrins, as well as glucose, to sorbitol, for example, from about 130° C. to about 220° C. and preferably from about 140° C. to about 200° C.

From the lower part of reactor 21 the liquid effluence from reactor tubes 25 comprising polyhydric alcohol consisting essentially of sorbitol is passed through valved lines 57 and 35 into evaporator 37. Hydrogen-containing gases are passed from reactor 21 through valved line 58 into drum 59 and thence through line 60 into drum 51. Optionally, liquid products taken from the lower part of reactor 21 may be passed in part or entirety through drum 59 by means of valved lines 61 and 62.

A valved line 65 is provided for the separate introduction of aqueous carbohydrate solution into the system from any suitable outside source. The charge thus introduced into the system through valved line 65 may consist essentially of the same type of carbohydrate materials introduced into reactor 20 or may comprise a carbohydrate differing from that comprised in the charge to reactor 20. When operating with an increasing temperature gradient through the reactors, and a charge comprising an admixture of monosaccharides with oligo- and/or polysaccharides is charged into the reactor 20 first in series, a separate carbohydrate charge consisting essentially of oligo- and/or polysaccharides or containing these higher carbohydrates in a higher proportion to lower carbohydrates than the charge to the first reactor, may advantageously be charged directly to the second reactor by means of valved line 65.

Valved line 66 is provided for the introduction of make-up hydrogen into the system from a suitable outside source.

Although the detailed description of the invention, made with reference to the drawing, has stressed the use of no more than two reactors it is to be understood that the use of a plurality of more than two reactors, any number of which are connected in parallel or in series, may be employed within the scope of the invention.

All parts of apparatus not essential to complete understanding of a description of the invention comprising, for example, pumps, accumulators, coolers, and the like have been omitted from the drawing for the purpose of clarity. It is to be understood that the apparatus shown may be modified as apparent to one skilled in the art without departing from the scope of the invention.

EXAMPLE II

Incompletely hydrolyzed starch having the following composition (calculated on the material in the dry state):

| | Per cent by weight |
|---|---|
| Glucose | 84.8 |
| Dextrin | 15.1 |
| Ash | 0.1 | was dissolved in a sufficient amount of water to result in an aqueous solution containing about 24 grams glucose and 4.3 dextrin per 100 grams solution. The solution was passed downwardly through three successive beds of high nickel content catalyst particles promoted by the presence of nickel silicate. Each catalyst bed was one meter in depth, had a cross sectional area of 5 square centimeters, and was positioned in an externally heated tubular reactor. The catalyst employed consisted essentially of 40% Ni, 11.2% $SiO_2$, and 48.8% bauxite, and was prepared substantially in the manner of the preparation of the catalyst of Example I. The first catalyst bed was maintained at a temperature of 120° C. to 130° C., the second at 140° C. to 150° C., and the third at 200° C. to 210° C. The aqueous solution charged to each bed was trickled therethrough at a rate of about 0.5 kilogram of solution per liter of catalyst per hour. Flooding of the catalyst bed was not encountered. A hydrogen atmosphere was maintained in the catalyst beds by the passage of a stream of hydrogen downwardly therethrough. A total amount of hydrogen equal to 1000 liters of hydrogen per kilogram of aqueous solution treated was employed.

Substantial conversion of the glucose to sorbitol was encountered in the first of the catalyst beds whereas the greater part of the conversion of dextrin to sorbitol was encountered in the last of the three successive beds. The effluence of the first and second catalyst beds contained 7.0% and 1.6% of glucose, respectively. The liquid effluence of the second catalyst bed which passed to the third bed contained 4% dextrin.

Liquid effluence from the third bed was found to have the following composition (based on the material in the dry state):

| | Per cent |
|---|---|
| Sorbitol | 99.0 |
| Glucose | 0.1 |
| Dextrin | 0.8 |
| Ash content | 0.1 | and was found to be substantially free of dissolved or entrained catalyst components.

EXAMPLE III

A glucose syrup consisting of 92% to 95% glucose and 8% to 5% water (100% glucose on a dry basis) was dissolved in water to obtain an aqueous solution containing 25 grams of glucose per 100 grams of aqueous solution. The aqueous solution was converted to sorbitol by downward passage through a high nickel content, nickel silicate promoted catalyst in two stages in a hydrogen atmosphere.

The catalyst beds employed in both stages of the operation consisted of beds of catalyst particles consisting essentially of 40% Ni, 11.2% $SiO_2$, and 48.8% bauxite which was prepared substantially as described in the preparation of the catalyst of Example I. The catalyst beds had a cross-sectional area of 5 sq. cm. and a depth of one meter.

In the first stage of the operation separate portions of the aqueous solution were trickled downwardly through the catalyst bed in three separate and independent runs under conditions set forth in the following table:

*First stage*

| Run No. | 1 | 2 | 3 |
|---|---|---|---|
| Catalyst, Temp., °C | 120–130 | 130 | 120–130 |
| Pressure, Atm. gauge | 150 | 150 | 50 |
| Glucose in aqueous solution charged, percent | 25 | 25 | 25 |
| Throughput: | | | |
| Kg. of aqueous glucose sol./lit. cat./hr | 0.5 | 1.0 | 0.5 |
| Lit. $H_2$/Kg. aqueous solution charged | 1,000 | 1,000 | 550 |
| Yield of sorbitol, percent of total liquid reaction product | 100 | 100 | 100 |
| Glucose in liquid effluence of catalyst beds, percent | 4.5 | 6.7 | 6.0 |
| Sorbitol in liquid effluence from reactor (based on material in the dry state) | 82.0 | 73.2 | 76.0 |

It is thus seen that in the first stage of the process about 80% of the glucose content of the aqueous solution charged is converted to sorbitol. The liquid products obtained in each of the runs constituting the first stage of the process were combined. The total resulting aqueous solution containing water, glucose and sorbitol had a glucose content of about 5.2%. The combined products of the first three runs constituting the first stage of the process were then trickled through beds of the high nickel content catalyst in an atmosphere of hydrogen in a second stage of the operation. The second stage of the operation consisted of three separate and independent runs conducted under the conditions set forth in the following table. Conditions employed and results obtained in each of the runs constituting the second stage of the process are set forth ion the following table:

*Second stage*

| Run No. | 1A | 1A | 1A |
|---|---|---|---|
| Catalyst, Temp., °C | 145 | 145 | 145 |
| Pressure, Atm. gauge | 150 | 150 | 150 |
| Glucose in aqueous solution charged | 5.2 | 5.2 | 5.2 |
| Throughput: | | | |
| Kg. of aqueous glucose sol./lit. cat./hr. | 1.0 | 0.5 | 1.0 |
| Lit. $H_2$/Kg. aqueous solution charged | 1,000 | 1,000 | 50 |
| Yields of sorbitol, percent of total liquid reaction product | 99.5 | 99 | 100 |
| Glucose in liquid effluence from catalyst bed, percent | 0.7 | 0.3 | 0.7 |
| Composition of the product (calculated on the material in the dry state): | | | |
| Percent Sorbitol | 97 | 98.8 | 97.2 |
| Percent Glucose | 2.8 | 1.2 | 2.8 |

In all of the runs constituting the first and second stage of the operation of Example II, the liquid charged to each catalyst bed, as well as all hydrogen introduced into the system, was passed downward through the beds under conditions avoiding the flooding of the catalyst bed.

The invention claimed is:

1. The process for the conversion of carbohydrates comprising glucose to polyhydric alcohol comprising sorbitol which comprises passing an aqueous solution of said carbohydrates and hydrogen downwardly through a bed of solid catalyst particles consisting essentially of about 40% nickel, about 11% $SiO_2$ and about 49% of bauxite, about 20 to about 60% of said nickel content being in the form of nickel silicate, the remainder of said nickel being in the form of reduced nickel, at a temperature of from about 100° C. to about 150° C., and at a pressure of from about 25 to about 200 atmospheres.

2. The process for the conversion of glucose to sorbitol which comprises trickling an aqueous solution of glucose downwardly through a bed of solid catalyst consisting essentially of about 35% to about 90% nickel in intimate admixture with about 75% to about 10% of bauxite, about 20% to about 60% of said nickel content being in the form of nickel silicate, the remainder of said nickel content being in the form of reduced nickel, at a temperature of from about 100° C. to about 150° C., and a pressure of from about 25 to about 200 atmospheres, and passing hydrogen downwardly through said catalyst bed.

3. The process for the conversion of glucose to sorbitol which comprises passing an aqueous solution of glucose and hydrogen downwardly through a bed of solid catalyst consisting essentially of about 25% to about 90% nickel in intimate admixture with about 75% to about 10% of adsorptive carrier material, about 20% to about 60% of said nickel content being in the form of nickel silicate, the remainder of said nickel content being in the form of reduced nickel, at a temperature of from about 100° C. to about 150° C., and a pressure of from about 25 to 200 atmospheres.

4. The process for the conversion of a monosaccharide comprising glucose to hexitols comprising sorbitol which comprises trickling an aqueous solution of said monosaccharide downwardly through a bed of solid catalyst consisting essentially of about 25% to about 90% nickel in intimate admixture with about 75% to about 10% of inert solid carrier material, about 20% to about 60% of said nickel content being in the form of nickel silicate, the remainder of said nickel content being in the form of reduced nickel, at a temperature of from about 100° C. to about 180° C. and a pressure of from about 25 to about 200 atmospheres, and passing hydrogen downwardly through said catalyst bed.

5. The process for the conversion of a monosaccharide to hexitol which comprises passing an aqueous solution of said monosaccharide and hydrogen downwardly through a bed of solid catalyst consisting essentially of about 25% to about 90% nickel in intimate admixture with about 75% to about 10% of solid carrier material, about 20% to about 60% of said nickel content being in the form of nickel silicate, the remainder of said nickel content being in the form of reduced nickel, at a temperature of from about 100° C. to about 180° C., and a pressure of from about 25 to about 200 atmospheres.

6. The process for the conversion of carbohydrates comprising a monosaccharide to hexitols which comprises passing an aqueous solution of said carbohydrates downwardly through a bed of solid catalyst consisting essentially of about 25% to about 90% nickel in intimate admixture with about 75% to about 10% of inert solid carrier material, about 20% to about 60% of said nickel content being in the form of nickel silicate, the remainder of said nickel content being in the form of reduced nickel, at a temperature of from about 100° C. to about 180° C., and a pressure of from about 25 to about 200 atmospheres, and maintaining a hydrogen atmosphere in said catalyst bed by passing hydrogen downwardly through said catalyst bed.

7. The process for the conversion of carbohydrates comprising dextrin to polyhydric alcohols consisting essentially of hexitols which comprises passing an aqueous solution of said carbohydrates and hydrogen downwardly through a bed of solid catalyst particles consisting essentially of about 40% nickel, about 11% SiO₂, and about 49% of bauxite, about 20 to about 60% of said nickel content being in the form of nickel silicate, the remainder of said nickel being in the form of reduced nickel, at a temperature of from about 180° C. to about 220° C., and at a pressure of from about 25 to about 200 atmospheres.

8. The process for the conversion of polysaccharides comprising dextrin to hexitols which comprises passing an aqueous solution of said polysaccharides and hydrogen downwardly through a bed of solid catalyst consisting essentially of about 25% to about 90% nickel in intimate admixture with about 75% to about 10% of bauxite, about 20% to about 60% of said nickel content being in the form of nickel silicate, the remainder of said nickel content being in the form of reduced nickel, at a temperature of from about 150° C. to about 250° C., and a pressure of from about 25 to 200 atmospheres.

9. The process for the conversion of polysaccharides to polyhydric alcohols having six carbon atoms to the molecule which comprises passing an aqueous solution of said polysaccharides and hydrogen downwardly through a bed of solid catalyst consisting essentially of about 25% to about 90% nickel in intimate admixture with about 75% to about 10% of inert solid carrier material, about 20% to about 60% of said nickel content being in the form of nickel silicate, the remainder of said nickel content being in the form of reduced nickel, at a temperature of from about 150° C. to about 250° C., and a pressure of from about 25 to about 200 atmospheres.

10. The process for the conversion of carbohydrates comprising a polysaccharide to polyhydric alcohols consisting essentially of hexitols which comprises passing an aqueous solution of said carbohydrates and hydrogen downwardly through a bed of solid catalyst consisting essentially of about 25% to about 90% nickel in intimate admixture with about 75% to about 10% of inert solid carrier material, about 20% to about 60% of said nickel content being in the form of nickel silicate, the remainder of said nickel content being in the form of reduced nickel, at a temperature of from about 150° C. to about 250° C., and a pressure of from about 25 to about 200 atmospheres.

11. The process for the conversion of carbohydrates comprising glucose and dextrin to polyhydric alcohol consisting essentially of sorbitol which comprises passing an aqueous solution of said carbohydrates downwardly through a reaction zone containing a bed of solid catalyst particles consisting essentially of about 25% to about 90% nickel in intimate admixture with about 75% to about 10% of bauxite, about 20% to about 60% of said nickel content being in the form of nickel silicate, the remainder of said nickel content being in the form of reduced nickel, maintaining an increasing temperature gradient downwardly through said reaction zone in the range of from about 100° C. to about 250° C., passing hydrogen downwardly through said reaction zone, and maintaining a pressure in the range of from about 25 to about 200 atmospheres in said reaction zone.

12. The process for the conversion of carbohydrates consisting essentially of incompletely hydrolyzed starch containing glucose and dextrin to polyhydric alcohol consisting essentially of hexitol which comprises passing an aqueous solution of said carbohydrates and hydrogen downwardly through a reaction zone containing a bed of solid catalyst particles consisting essentially of about 25% to about 90% nickel in intimate admixture with about 75% to about 10% of inert support material, about 20% to about 60% of said nickel content being in the form of nickel silicate, the remainder of said nickel being in the form of reduced nickel, maintaining an increasing temperature gradient downwardly through said reaction zone in the range of from about 100° C. to about 250° C., and maintaining a pressure in the range of from about 25 to 200 atmospheres in said reaction zone.

13. The process for the conversion of a mixture of carbohydrates comprising a monosaccharide and a polysaccharide to polyhydric alcohols having six carbon atoms to the molecule which comprises passing an aqueous solution of said carbohydrates and hydrogen downwardly through a reaction zone containing a bed of solid catalyst particles consisting essentially of about 25% to about 90% nickel in intimate admixture with about 75% to about 10% of inert support material, about 20% to about 60% of said nickel content being in the form of nickel silicate, the remainder of said nickel content being in the form of reduced nickel, maintaining an increasing temperature gradient downwardly through said reaction zone in the range of from about 100° C. to about 250° C., and maintaining a pressure in the range of from about 25 to about 200 atmospheres in said reaction zone.

14. The process for the conversion of a carbohydrate to a polyhydric alcohol consisting essentially of hexitol which comprises passing an aqueous solution of said carbohydrate and hydrogen downwardly through a reaction zone containing a bed of solid catalyst particles consisting essentially of about 25% to about 90% nickel in intimate admixture with about 75% to about 10% of an inert support material, about 20% to about 60% of said nickel being in the form of nickel silicate, the remainder of said nickel content being in the form of reduced nickel, at a temperature of from about 100° C. to about 250° C., and a pressure of from about 25 to about 200 atmospheres.

15. The process for the conversion of a carbohydrate to a polyhydric alcohol having six carbon atoms to the molecule which comprises passing an aqueous solution of said carbohydrate and hydrogen downwardly through a bed of solid catalyst consisting essentially of about 25% to about 90% nickel in intimate admixture with about 75% to about 10% of an inert support material, about 20% to about 60% of said nickel content being in the form of nickel silicate, the remainder of said nickel content being in the form of reduced nickel, at a temperature in the range of from about 100° C. to about 250° C., and at a pressure in the range of from about 25 to about 200 atmospheres.

JACOB KOOME.
CHRISTIAAN NICOLAAS
JACOBUS de NOOIJER.

References Cited in the file of this patent

UNITED STATES PATENTS

| Number | Name | Date |
|---|---|---|
| 1,963,997 | Larchar | June 26, 1934 |
| 2,292,293 | Rose | Aug. 4, 1942 |
| 2,305,104 | Pardee | Dec. 15, 1942 |
| 2,518,235 | Hartstra et al. | Aug. 8, 1950 |
| 2,546,103 | Lolkema et al. | Mar. 20, 1951 |

OTHER REFERENCES

Ellis: "Hydrogenation of Organic Substances," 3rd ed., pages 402–403; pub. by D. Van Nostrand, Inc., New York, 1930.